(12) United States Patent
Creager et al.

(10) Patent No.: US 6,722,564 B2
(45) Date of Patent: Apr. 20, 2004

(54) METHOD, APPARATUS, AND PROGRAM FOR DETERMINING CORRECT CARTRIDGE ORIENTATION IN AN AUTOMATED TAPE LIBRARY

(75) Inventors: Robert S. Creager, Berthoud, CO (US); James Ries, Boulder, CO (US); Terry Lane, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 42 days.

(21) Appl. No.: 10/003,351

(22) Filed: Dec. 6, 2001

(65) Prior Publication Data

US 2003/0106937 A1 Jun. 12, 2003

(51) Int. Cl.[7] .............................................. G06K 15/00
(52) U.S. Cl. ..................................... 235/383; 369/34.01
(58) Field of Search .............................. 235/383, 385; 369/34.01

(56) References Cited

U.S. PATENT DOCUMENTS 5,323,327 A * 6/1994 Carmichael et al. ........ 700/215
5,450,385 A * 9/1995 Ellis et al. .................. 369/30.3
6,246,642 B1 * 6/2001 Gardner, Jr. et al. ..... 369/30.42

OTHER PUBLICATIONS

IBM Technical Disclosure Bulletin, "Use of Laser Barcode Scanner to Detect Cartridges Upside Down in Library", Mar. 1994, vol. 37, Issue 3, pp. 205–206.*

* cited by examiner

Primary Examiner—Mark Tremblay
(74) Attorney, Agent, or Firm—Carstens, Yee & Cahoon, LLP

(57) ABSTRACT

An automated media library gathers information about each readable cartridge label using a camera. From the label information, the orientation of the cartridge may be determined. For each cartridge with an unreadable label or no label, the media library attempts a get/put operation. If the get/put operation fails, the cartridge is marked as incorrectly oriented. Alternatively, the tape library may attempt a get/put operation on all removable media cartridges. A similar process is performed when a cartridge access port is closed and the cartridge access port is marked inaccessible to the host when an incorrectly oriented cartridge is detected.

11 Claims, 5 Drawing Sheets

METHOD, APPARATUS, AND PROGRAM FOR DETERMINING CORRECT CARTRIDGE ORIENTATION IN AN AUTOMATED TAPE LIBRARY

BACKGROUND OF THE INVENTION

1. Technical Field

The present invention relates to storage tapes and, in particular, to automated tape libraries. Still more particularly, the present invention provides a method, apparatus, and program for determining correct cartridge orientation in an automated removable media library.

2. Description of Related Art

A tape library is a high-capacity data storage system for storing, retrieving, reading, and writing multiple magnetic tape cartridges. Also called a "tape automation system," a tape library contains storage racks for holding the cartridges and a robotic mechanism for moving the cartridge to the drives. Suppliers of inexpensive automated tape libraries typically do not provide trained personnel to support the tape libraries. With the cartridge layout in some libraries, there is a potential for an end user to incorrectly orient cartridges when placing them in the library during installation and during cartridge import operations.

Having this problem occur in the field with untrained personnel will likely cause an increased volume of calls to telephone support centers, resulting in an added cost to the tape library suppliers and their partners. Furthermore, untrained personnel may not realize that errors occur because cartridges are oriented incorrectly. Thus, customers may unjustly develop unfavorable perceptions of tape library quality. These false perceptions may affect futures sales.

Therefore, it would be advantageous to provide a mechanism for determining correct cartridge orientation in an automated tape library.

SUMMARY OF THE INVENTION

The present invention provides an enhanced media library that detects incorrectly oriented cartridges during initialization. During a cell audit phase of library initialization, label position information is collected about each readable cartridge label. Based on unique characteristics of cartridge and label combinations, cartridge orientation is determined. A list of incorrectly oriented cartridges is compiled using this technique. A list of unreadable or unlabeled cartridges is also compiled.

An additional initialization phase is used to attempt a robotic get/put operation on each unreadable or unlabeled cartridge and each cartridge that is incorrectly oriented based on the label. If the get/put operation fails, then the cartridge is added to the list of incorrectly oriented cartridges. When an incorrectly oriented cartridge is detected, the library fails initialization and indicates that incorrectly oriented cartridges are found.

The media library may also execute an audit during import operations when a cartridge access port is closed. When an incorrectly oriented cartridge is detected during the cartridge access port audit, the cartridge access port is marked as inaccessible to the host, preventing usage of the cartridge access port until all cartridges in the cartridge access port are correctly oriented.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
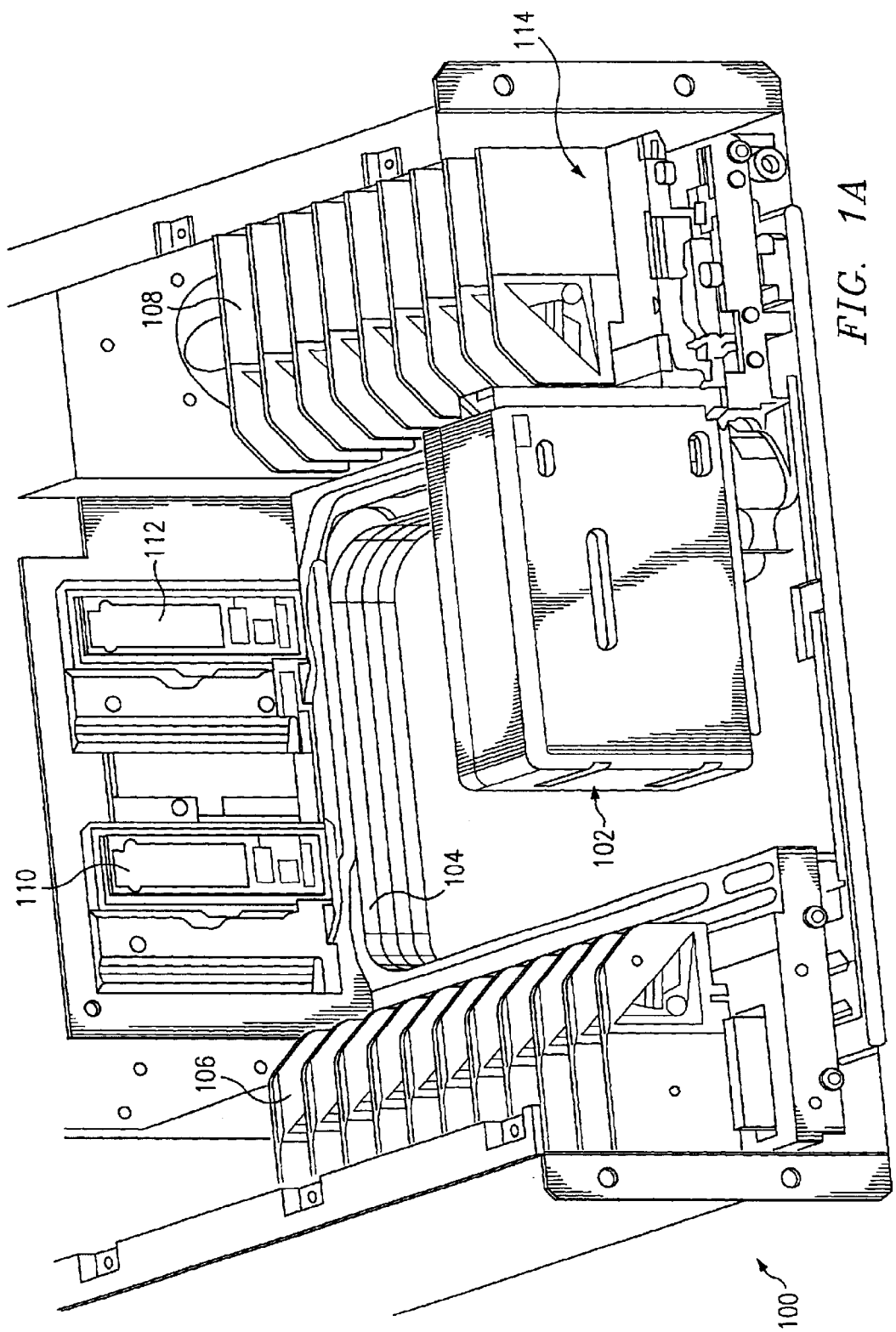
FIGS. 1A, 1B, and 1C depict a pictorial representation of an automated media library in which the present invention may be implemented.
Figure 1B:
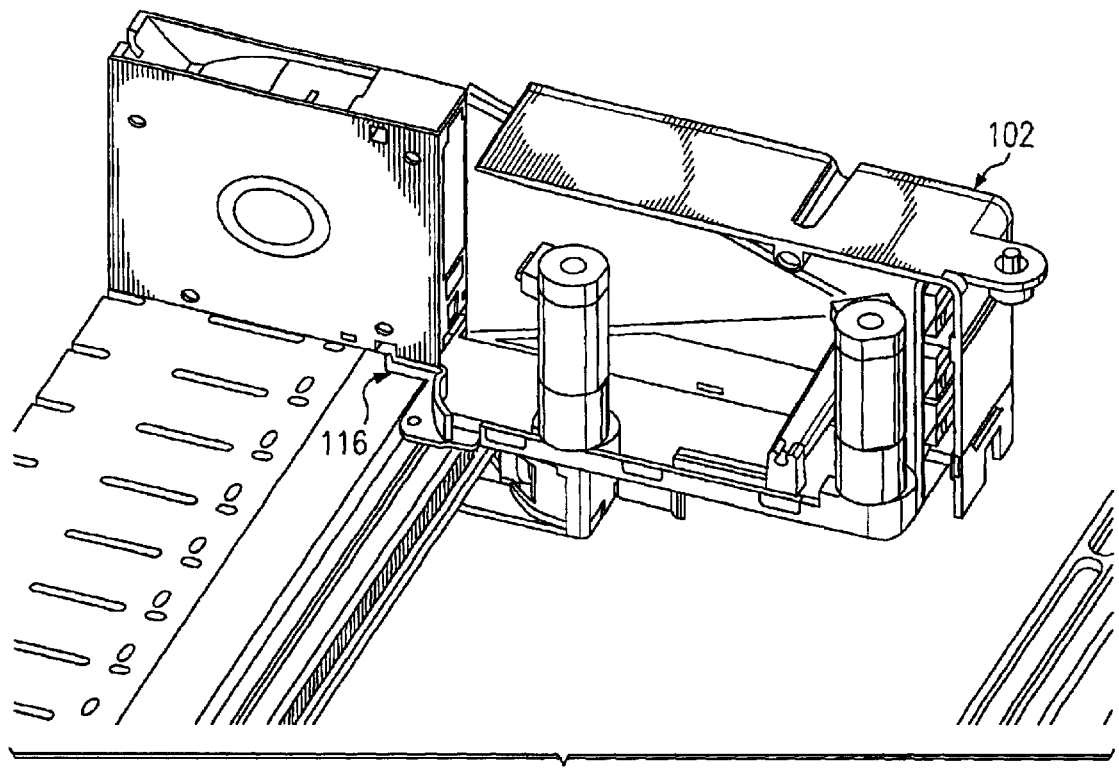

With reference now to the figures, FIGS. 1A and 1B depict a pictorial representation of an automated media library in which the present invention may be implemented. Particularly, with respect to FIG. 1A, automated media library 100 is a high-capacity data storage system for storing, retrieving, reading and writing multiple magnetic tape cartridges. Automated media library 100 includes a picker mechanism 102, also referred to as a "grabber" or "hand" mechanism. The picker mechanism is a robotic device that moves along U-shaped track 104 and retrieves and places tapes into cartridge storage cells 106, 108 or drives 110, 112.

Cartridge storage cells 106, 108 are receptacles for holding the tape cartridges that make up the library. Each time a tape is to be read or written, picker mechanism 102 retrieves the tape from its storage cell ("get" operation) and places it in one of drives 110, 112 ("put" operation). When the tape cartridge is no longer being read or written, the picker mechanism then retrieves the cartridge from the drive and returns it to its corresponding cartridge storage cell. The automated tape library shown in FIG. 1A is exemplary and may include more or fewer cartridge storage cells, drives, and picker mechanisms in varying configurations, depending upon the implementation.

Automated media library 100 also includes cartridge access port (CAP) 114. The CAP is a mechanical device for inserting tape cartridges into the library. The automated media library considers the cartridges in the CAP as any other cartridge in the library. However, when the library housing is normally opened and closed, the library undergoes a lengthy initialization and audit phase. Therefore, CAP 114 allows cartridges to be interchanged without opening the library housing.

In the example shown in FIG. 1A, the CAP holds one tape cartridge. However, a person of ordinary skill in the art will recognize that the CAP may be modified to accommodate more tape cartridges, depending upon the implementation. Automated media library 100 is shown as a tape library; however, the library may also be used to provide access to other removable media, such as magnetic or optical disks.

Turning now to FIG. 1B, a reverse view of picker mechanism 102 is shown. Picker mechanism 102 includes hook 116, referred to as a "grabber" or "hand," that is used to grip the tape cartridges in the cartridge storage cells and the CAP. The picker mechanism moves along the track to orient grabber 116 in front of a desired tape cartridge. Then, picker mechanism retrieves the cartridge via hook 116.

Figure 1C:
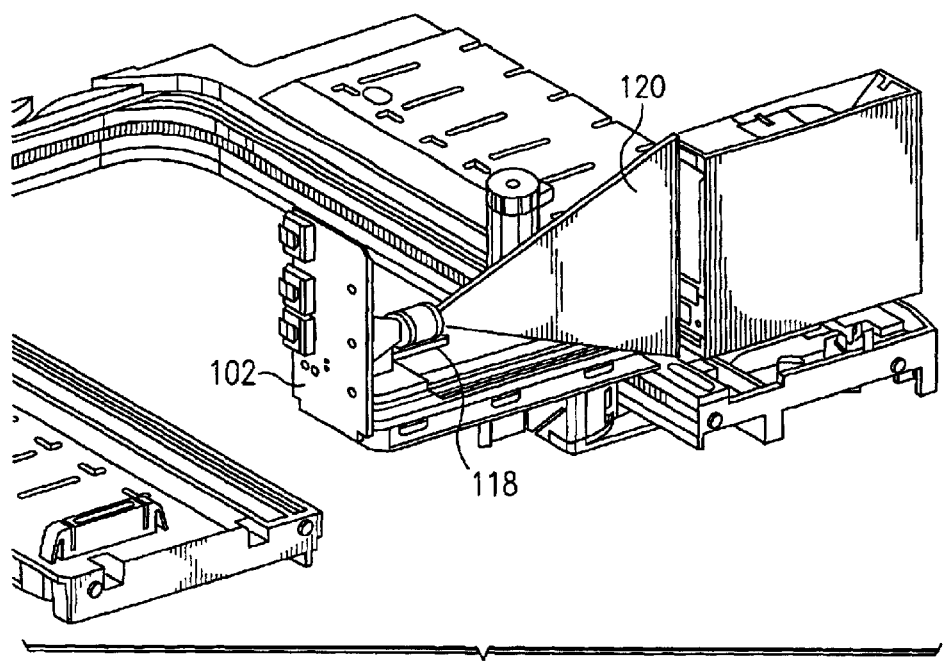

With reference now to FIG. 1C, another view of picker mechanism 102 is shown. Picker mechanism 102 also holds camera 118. The camera may read information from labels affixed to the ends of the tape cartridges. The field of view of the camera is shown by cone 120. The information gathered from camera 118 may include, for example, recognition of characters, orientation of information on the label, position information on the label, whether the label is unreadable, and whether the tape cartridge is unlabeled. This information may be used to determine whether the tape cartridge is correctly oriented.

Figure 2:
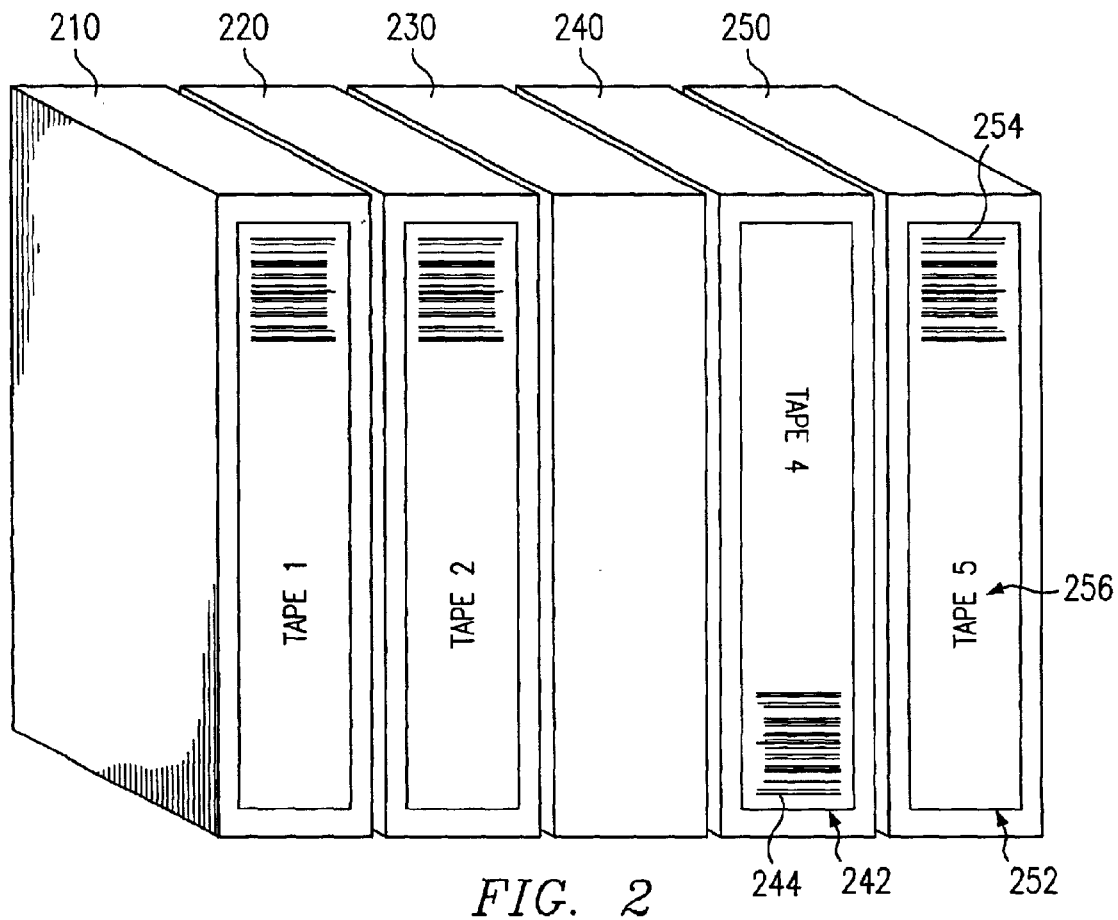
FIG. 2 depicts an exemplary arrangement of a plurality of cartridges in a media library in accordance with a preferred embodiment of the present invention.

Turning now to FIG. 2, an exemplary arrangement of a plurality of cartridges in a media library is shown in accordance with a preferred embodiment of the present invention. Particularly, an automated media library may include tape cartridges 210, 220, 230, 240, 250 held in storage cells in the orientation illustrated in FIG. 2. The picker mechanism expects the tape cartridges to be inserted into the storage cells in a predetermined orientation. The camera may read information from labels affixed to the ends of the tape cartridges.

For example, label 252 is affixed to cartridge 250. The label may include, for example, barcode 254 and text 256 made up of characters. In accordance with a preferred embodiment of the present invention, a controller receives label information from the camera and uses this information to determine whether the tape cartridge is correctly oriented. For example, based on the location of barcode 254 and the orientation of text 256, the controller may determine that cartridge 250 is correctly oriented. However, based on the information on label 242, such as the location of barcode 244, the controller may determine that cartridge 240 is incorrectly oriented.

The processor may also compile a list of cartridges for which the orientation is unknown. For example, the processor may determine that the orientation of cartridge 240 is unknown based on the label information, rather than assume that the cartridge is incorrectly oriented. Furthermore, the processor may include cartridges for which the label is missing or unreadable in the orientation unknown list. For example, cartridge 230 is unlabeled. The processor may then determine whether these cartridges are indeed incorrectly oriented by attempting a get/put operation on these cartridges using picker mechanism 102 in FIG. 1A. If the cartridges are incorrectly oriented, the hook in the picker mechanism will fail to grab onto the cartridge and the get/put operation will fail.

Figure 3:
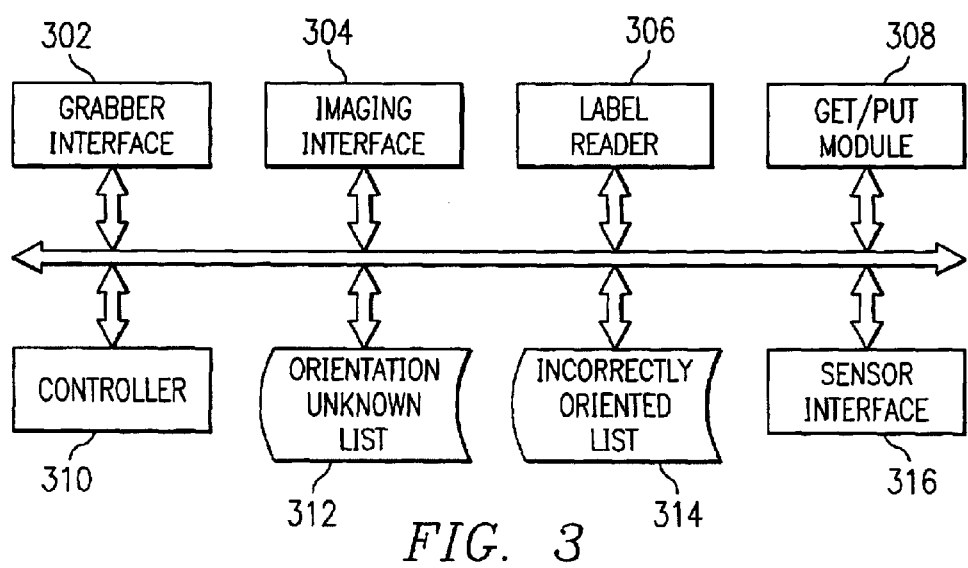
FIG. 3 is a block diagram illustrating the functional components of an automated media library in accordance with a preferred embodiment of the present invention.

With reference now to FIG. 3, a block diagram illustrating the functional components of an automated tape library is shown in accordance with a preferred embodiment of the present invention. The tape library includes grabber interface 302 and imaging interface 304. The grabber mechanism receives information from and sends information to the grabber interface. The imaging interface receives image information collected from an imaging device, such as camera 118 in FIG. 1C. Imaging interface may receive image information from other imaging devices, such as magnetic ink readers. Label reader 306 processes the image information to gather information about each readable cartridge label. Label reader 306 may determine label type and the orientation of information on the label. Get/put module 308 instructs the tape library to perform a get/put operation on cartridges.

The tape library also includes controller 310. The controller controls the components of the tape library, including grabber interface 302, imaging interface 304, label reader 306, and get/put module 308. Controller 310 also processes the information gathered from the imaging interface and label reader to determine incorrectly oriented cartridges, cartridges for which the label is unreadable, and unlabeled cartridges. The identification (ID) of each unlabeled cartridge and each cartridge with an unreadable label is stored in orientation unknown list 312. The ID of each cartridge that is incorrectly oriented based on label position is also stored in orientation unknown list 312.

Controller 310 also controls get/put module 308 to perform a get/put operation on each cartridge in orientation unknown list 312. If the get/put operation fails, then the identification of the cartridge is added to incorrectly oriented list 314. Upon a subsequent initialization, the controller may also perform a get/put operation on each cartridge in the incorrectly oriented list to verify that the orientation has been corrected.

The components in FIG. 3 may be hardware, such as specially designed circuitry, or software. In accordance with a preferred embodiment of the present invention the components may be a combination of hardware and software, such as firmware. Furthermore, orientation unknown list 312 and incorrectly oriented list 314 may be stored in volatile storage, such as random access memory, or persistent storage, such as a hard disk or tape cartridge. The system shown in FIG. 3 may also include sensor interface 316 for detecting when the library housing is opened or closed and when the CAP is engaged. Thus, controller 310 may launch initialization and a cell audit phases when the library housing is closed and launch a CAP audit phase when the CAP is engaged.

Figure 4:
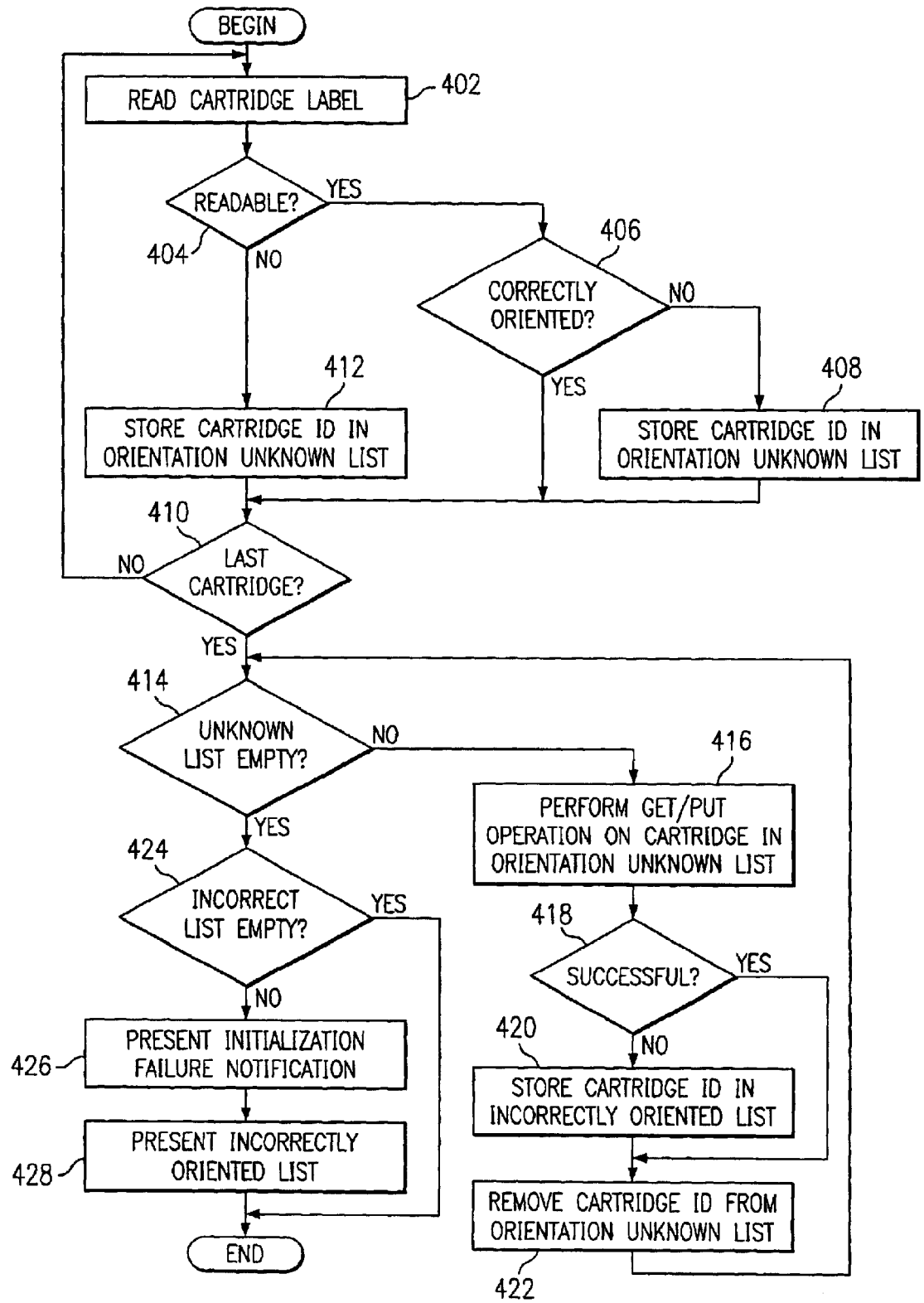
FIG. 4 is a flowchart illustrating the operation of a cell audit phase in accordance with a preferred embodiment of the present invention.

With reference to FIG. 4, a flowchart illustrating the operation of a cell audit phase is shown in accordance with a preferred embodiment of the present invention. The process begins and reads a cartridge label (step 402). A determination is made as to whether the label is readable (step 404). If the label is readable, a determination is made as to whether the cartridge is oriented correctly based on label position (step 406). If the cartridge is not oriented correctly based on label position, the process stores the cartridge ID in the orientation unknown list (step 408) and a determination is made as to whether the cartridge is the last cartridge in the library (step 410). If the cartridge is correctly oriented in step 406, the process proceeds to step 410 to determine whether the cartridge is the last cartridge in the library.

If the label is unreadable in step 404, the process stores the cartridge ID in the orientation unknown list (step 412). Next, the process proceeds to step 410 to determine whether the cartridge is the last cartridge in the library. If the cartridge is not the last cartridge, the process returns to step 402 to read the next cartridge label. If the cartridge is the last cartridge in the library in step 410, a determination is made as to whether the orientation unknown list is empty (step 414).

If the orientation unknown list is not empty, the process performs a get/put operation on a cartridge in the orientation unknown list (step 416). Thereafter, a determination is made as to whether the get/put operation is successful (step 418). If the get/put operation is not successful, the process stores the cartridge ID in the incorrectly oriented list (step 420) and removes the cartridge ID from the orientation unknown list (step 422). If the get/put operation is successful in step 418, the process simply removes the cartridge ID from the orientation unknown list (step 422).

If the orientation unknown list is empty in step 414, a determination is made as to whether the incorrectly oriented list is empty (step 424). If the incorrectly oriented list is empty, the process ends. However, if the incorrectly oriented list is not empty, the process presents an initialization failure notification (step 426), presents the incorrectly oriented list (step 428) and ends.

Figure 5:
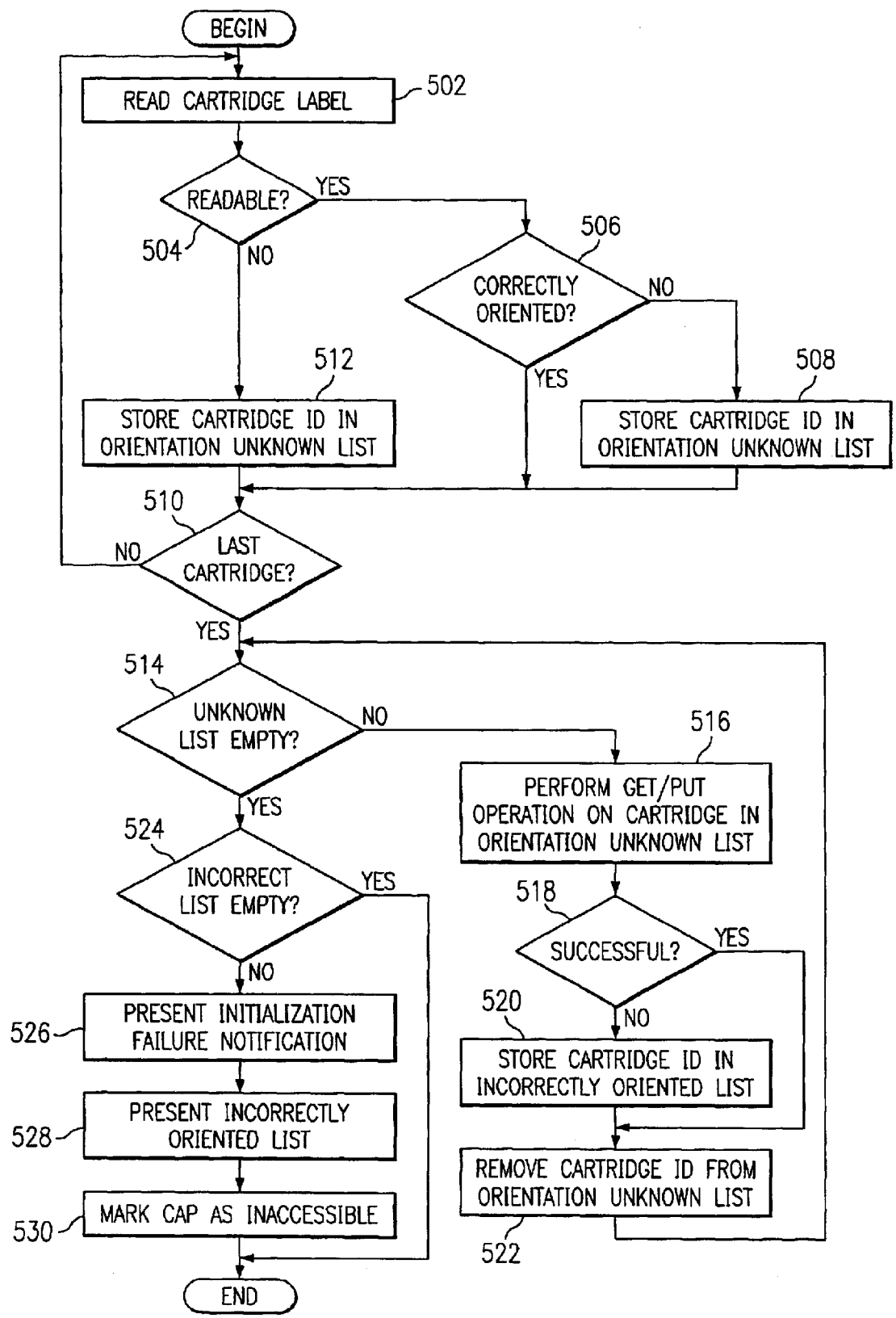
FIG. 5 is a flowchart illustrating the operation of a cartridge access port audit phase in accordance with a preferred embodiment of the present invention.

Turning now to FIG. 5, a flowchart illustrating the operation of a cartridge access port audit phase is shown in accordance with a preferred embodiment of the present invention. The process begins and reads a cartridge label (step 502). A determination is made as to whether the label is readable (step 504). If the label is readable, a determination is made as to whether the cartridge is oriented correctly based on label position (step 506). If the cartridge is not oriented correctly based on label position, the process stores the cartridge ID in the orientation unknown list (step 508) and a determination is made as to whether the cartridge is the last cartridge in the library (step 510). If the cartridge label is correctly oriented in step 506, the process proceeds to step 510 to determine whether the cartridge is the last cartridge in the cartridge access port.

If the label is unreadable in step 504, the process stores the cartridge ID in the incorrectly oriented list (step 512). Next, the process proceeds to step 510 to determine whether the cartridge is the last cartridge in the cartridge access port. If the cartridge is not the last cartridge, the process returns to step 502 to read the next cartridge label.

If the cartridge is the last cartridge in the library in step 510, a determination is made as to whether the orientation unknown list is empty (step 514). If the orientation unknown list is not empty, the process performs a get/put operation on a cartridge in the orientation unknown list (step 516). Thereafter, a determination is made as to whether the get/put operation is successful (step 518). If the get/put operation is not successful, the process stores the cartridge ID in the incorrectly oriented list (step 520), removes the cartridge ID from the orientation unknown list (step 522), and returns to step 514 to determine whether the orientation unknown list is empty. If the get/put operation is successful in step 518, the process removes the cartridge ID from the orientation unknown list (step 522) and returns to step 514 to determine whether the orientation unknown list is empty.

If the orientation unknown list is empty in step 514, a determination is made as to whether the incorrectly oriented list is empty (step 524). If the incorrectly oriented list is empty, the process ends. If, however, the incorrectly oriented list is not empty in step 524, the process presents a CAP initialization failure notification (step 526), presents the incorrectly oriented list (step 528), marks the CAP as inaccessible to the host (step 530), and ends.

Thus, the present invention solves the disadvantages of the prior art by gathering information about each readable cartridge label. From the label information, the orientation of the cartridge may be determined. For each cartridge with an unreadable label or no label, the tape library attempts a get/put operation. If the get/put operation fails, the cartridge is marked as incorrectly oriented. Alternatively, the tape library may attempt a get/put operation on all cartridges. A similar process is performed when a cartridge access port is closed and the cartridge access port is marked inaccessible to the host when an incorrectly oriented cartridge is detected.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting incorrect cartridge orientation in an automated media library, comprising:

reading label information from a cartridge label on a cartridge; and determining whether the cartridge is correctly oriented based on the label information, wherein the label information comprises a location of a barcode on the label.

2. The method of claim 1, further comprising:

adding the cartridge to an orientation unknown list if the cartridge is not correctly oriented based on the label information.

3. The method of claim 2, further comprising:

performing a retrieval operation on each cartridge in the orientation unknown list; and determining whether each cartridge is correctly oriented based on success of the retrieval operation.

4. A method for detecting incorrect cartridge orientation in a automated media library, comprising:

reading label information from a cartridge label on a cartridge, wherein the label information comprises a location of a barcode on the cartridge label;

determining whether the cartridge is correctly oriented based on the label information;

performing a retrieval operation on the cartridge responsive to the cartridge not being correctly oriented based on the label information; and marking the cartridge as incorrectly oriented if the retrieval operation is not successful.

5. An apparatus for detecting incorrect cartridge orientation for a cartridge in an automated media library, comprising:

an imaging interface that gathers cartridge label information about a cartridge, wherein the cartridge label information comprises a location of a barcode on a cartridge label;

a label reader that determines whether the cartridge label is correctly oriented based on the cartridge label information; and an operation component that performs a retrieval operation on the cartridge responsive to the cartridge not being correctly oriented based on the cartridge label information and marks the cartridge as incorrectly oriented if the retrieval operation is not successful.

6. An apparatus for detecting incorrect cartridge orientation in an automated media library, comprising:

reading means for reading label information from a cartridge label on a cartridge; and determination means for determining whether the cartridge is correctly oriented based on the label information, wherein the label information comprises a location of a barcode on the label.

7. The apparatus of claim 6, further comprising:

means for adding the cartridge to an orientation unknown list if the cartridge is not correctly oriented based on the label information.

8. The apparatus of claim 7, further comprising:

means for performing a retrieval operation on each cartridge in the orientation unknown list; and means for determining whether each cartridge is correctly oriented based on success of the retrieval operation.

9. An apparatus for detecting incorrect cartridge orientation in an automated media library, comprising:

reading means for reading label information from a cartridge label on a cartridges wherein the label in information comprises a location of a barcode on the cartridge label;

determination means for determining whether the cartridge is correctly oriented based on the label information;

means for performing a retrieval operation on the cartridge responsive to the cartridge not being correctly oriented based on the label information; and means for marking the cartridge as incorrectly oriented if the retrieval operation is not successful.

10. A computer program product, in a computer readable medium, for detecting incorrect cartridge orientation in an automated media library, comprising:

instructions for reading label information from a cartridge label on a cartridge; and instructions for determining whether the cartridge is correctly oriented based on the label information, wherein the label information comprises a location of a barcode on the label.

11. A computer program produce, in a computer readable medium, for detecting incorrect cartridge orientation in an automated media library, comprising:

instructions for reading label information from a cartridge label on a cartridge, wherein the label information comprises a location of a barcode on the cartridge label;

instructions for determining whether the cartridge is correctly oriented based on the label information;

instructions for performing a retrieval operation on the cartridge responsive to the cartridge not being correctly oriented based on the label information; and instructions for marking the cartridge as incorrectly oriented if the retrieval operation is not successful.

* * * * *